United States Patent
Swarup et al.

(10) Patent No.: US 11,365,327 B2
(45) Date of Patent: Jun. 21, 2022

(54) METHODS FOR COATING SUBSTRATES AND MULTILAYER COATED SUBSTRATES

(71) Applicant: PPG INDUSTRIES OHIO, INC., Cleveland, OH (US)

(72) Inventors: Shanti Swarup, Allison Park, PA (US); Xiangling Xu, Pittsburgh, PA (US); Richard J. Sadvary, Tarentum, PA (US); Anthony M. Chasser, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 201 days.

(21) Appl. No.: 16/411,637

(22) Filed: May 14, 2019

(65) Prior Publication Data

US 2019/0264064 A1 Aug. 29, 2019

Related U.S. Application Data

(62) Division of application No. 13/780,628, filed on Feb. 28, 2013, now abandoned.

(51) Int. Cl.
*C09D 175/14* (2006.01)
*B05D 7/00* (2006.01)

(52) U.S. Cl.
CPC ............. *C09D 175/14* (2013.01); *B05D 7/57* (2013.01)

(58) Field of Classification Search
CPC ................................ C09D 175/14; B05D 7/57
See application file for complete search history.

(56) References Cited

U.S. PATENT DOCUMENTS

| | | | |
|---|---|---|---|
| 5,348,997 A | 9/1994 | Kato et al. | |
| 5,472,996 A | 12/1995 | Hayashi et al. | |
| 5,571,861 A | 11/1996 | Klein et al. | |
| 5,614,582 A | 3/1997 | Hori et al. | |
| 5,623,016 A | 4/1997 | Klein et al. | |
| 5,891,981 A * | 4/1999 | Mauer | C08G 59/5086 |
| | | | 528/45 |
| 5,912,293 A | 6/1999 | Stockwell et al. | |
| 7,531,074 B2 | 5/2009 | Purdy et al. | |
| 9,365,731 B2 | 6/2016 | Jhaveri et al. | |
| 2003/0220446 A1 | 11/2003 | Faler et al. | |
| 2004/0159555 A1 | 8/2004 | Purdy et al. | |
| 2004/0228975 A1 | 11/2004 | Takesako et al. | |

(Continued)

FOREIGN PATENT DOCUMENTS

| | | |
|---|---|---|
| CN | 101235195 A | 8/2008 |
| JP | 1995082456 A | 3/1995 |

(Continued)

OTHER PUBLICATIONS

Hesselmans et al., "Polycarbodiimide crosslinkers", Progress in Organic Coatings 55 (2006), pp. 142-148, Elsevier B. V.

*Primary Examiner* — Robert S Walters, Jr.
(74) *Attorney, Agent, or Firm* — Krisanne Shideler

(57) ABSTRACT

A method for applying a multilayer coating comprising a basecoat and a clearcoat is disclosed. The basecoat is a curable aqueous composition comprising (1) polymeric particles containing carboxylic acid functionality and prepared from ethylenically unsaturated compounds including a multi-ethylenically unsaturated monomer, and (2) a polycarbodiimide. Also provided is a multilayer coated substrate.

14 Claims, 1 Drawing Sheet

(56) References Cited

U.S. PATENT DOCUMENTS

| | | |
|---|---|---|
| 2009/0246393 A1 | 10/2009 | Ambrose et al. |
| 2011/0070374 A1 | 3/2011 | Ambrose et al. |
| 2011/0177352 A1 | 7/2011 | Ambrose et al. |
| 2011/0217471 A1* | 9/2011 | Schwendeman ..... C08G 18/095 427/385.5 |
| 2012/0021228 A1 | 1/2012 | Kitagawa et al. |
| 2013/0122765 A1 | 5/2013 | Ambrose et al. |

FOREIGN PATENT DOCUMENTS

| | | |
|---|---|---|
| JP | 10-139839 | 5/1998 |
| JP | 2010215885 A | 9/2010 |
| RU | 2136713 C1 | 9/1999 |
| WO | WO 97/47401 | 12/1997 |
| WO | WO 2011/127641 A1 | 10/2011 |

\* cited by examiner

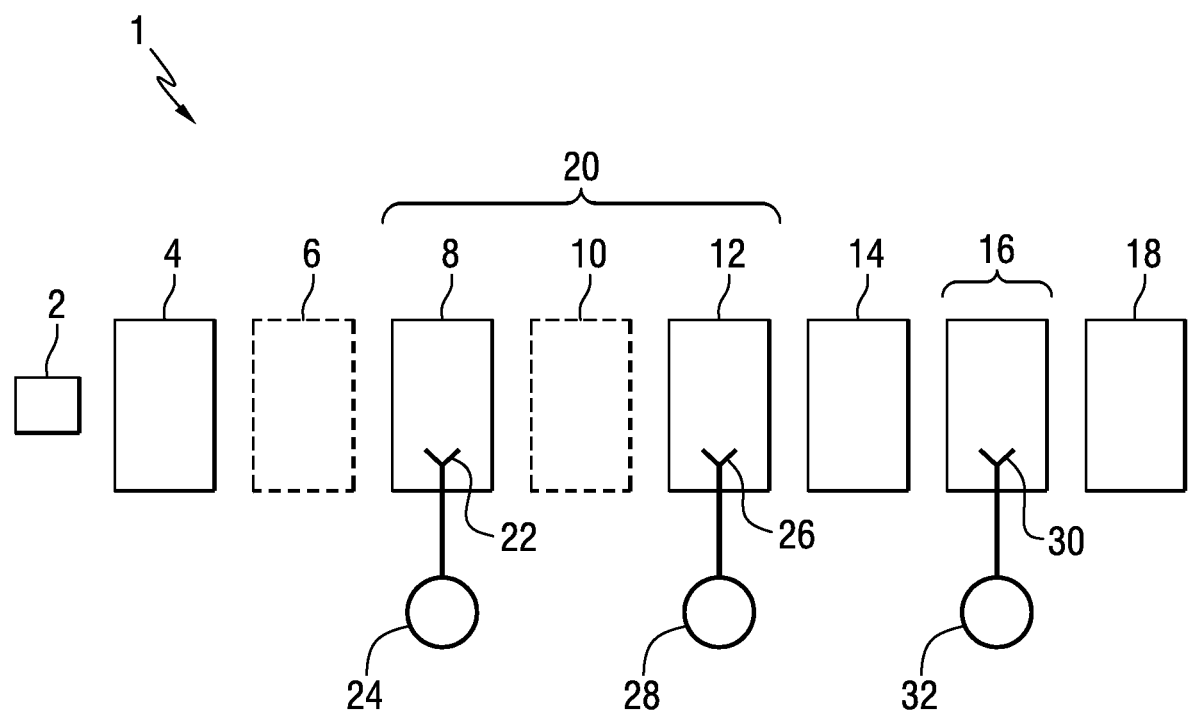

METHODS FOR COATING SUBSTRATES AND MULTILAYER COATED SUBSTRATES

CROSS-REFERENCE TO RELATED APPLICATIONS

This application is a divisional of U.S. patent application Ser. No. 13/780,628, filed on Feb. 28, 2013, and entitled "METHODS AND COMPOSITIONS FOR COATING SUBSTRATES", which is incorporated herein by reference in its entirety.

FIELD OF THE INVENTION

The present invention relates to methods for coating automotive substrates and to the coating compositions used in the methods. More particularly, the invention relates to (1) coating automotive substrates with a reduced number of steps while producing coatings meeting the commercial standards for appearance and for physical and chemical properties and (2) the multilayer coated substrates prepared by such methods.

BACKGROUND OF THE INVENTION

Commercial automotive coatings, that is, coatings for passenger cars and trucks, require many application and processing steps. Typically, a primer coat to provide corrosion resistance is applied by electrodeposition to the automotive body and then cured by heating in an oven. The automotive body is then passed to a coating station where a primer surfacer is applied to provide a thick heavy pigmented coating that provides protection against road stone damage and also shields the electrodeposited primer layer from ultraviolet light that can deteriorate the primer layer. The primer surfacer layer is separately heat cured. Next a color-imparting basecoat is applied to the cured primer surfacer layer. The basecoat layer is typically derived from a water-based composition comprising a polymer, typically a (meth)acrylic polyol and a melamine curing agent. The basecoat layer is typically dehydrated at about 80-85° C. but not cured. An unpigmented transparent coat, called a clearcoat, is applied to the dehydrated basecoat. The clearcoat is a curable composition and the composite color plus clear coating cured in one step at about 140-150° C. This is the case even if the clearcoat is curable at lower temperatures such as with clearcoats that are based on hydroxyl-isocyanate curing because the basecoat composition with the melamine curing agent requires higher temperatures for curing.

There have been attempts to reduce the coating and curing steps required in an automotive coating line. Accordingly, formation of the basecoats have improved such that they provide stone chip resistance and ultraviolet protective properties allowing the elimination of the primer surfacer layer while still providing the color aesthetics necessary for an automotive color-imparting topcoat.

However, a problem exists in that the basecoat layer is only dehydrated but not cured before application of the clearcoat. The uncured or partially cured basecoat does not have sufficient "hold out" properties, that is, solvents from the clearcoat can migrate into the basecoat adversely affecting pigment orientation in the basecoat. Also, lack of cure can adversely affect intercoat adhesion. The basecoat could be cured before application of the clearcoat but this would add another energy-consuming step in the coating process.

The present invention provides a solution to these problems by providing a basecoat composition that cures through the dehydration step resulting in a high degree of cure before the clearcoat is applied. Since the basecoat has a high degree of cure, this allows the clearcoat to be cured at a lower temperature.

SUMMARY OF THE INVENTION

The present invention provides a method of applying a multilayer coating to a substrate comprising:
 (a) applying, without application of an intermediate primer surfacer coating, a color-imparting, pigment-containing basecoat composition directly to a cured electrodeposited primer coating that is adhered to the substrate to form a curable color-imparting basecoat layer, and
 (b) applying a curable unpigmented coating composition to the basecoat layer to form a transparent coating layer over the basecoat layer, wherein the basecoat layer is formed by depositing a curable aqueous composition comprising:
  (i) a continuous phase comprising water, and
  (ii) a dispersed phase comprising:
   (A) polymeric particles containing carboxylic acid functionality prepared from the polymerization of a mixture of ethylenically unsaturated monomer compounds, including ethylenically unsaturated monomers comprising a multi-ethylenically unsaturated monomer; and
   (B) a polycarbodiimide.

The invention also provides multilayer coated substrates comprising
 (a) a curable color-imparting basecoat layer comprising a color-imparting, pigment-containing basecoat composition applied directly to a cured electrodeposited primer coating without application of an intermediate primer surfacer coating, wherein the cured electrodeposited primer coating is adhered to the substrate, and
 (b) a curable unpigmented coating composition applied to the basecoat layer to form a clear or transparent coating layer over the basecoat layer, wherein the basecoat layer is deposited from a curable aqueous composition comprising:
  (i) a continuous phase comprising water, and
  (ii) a dispersed phase comprising:
   (A) polymeric particles containing carboxylic acid functionality prepared from the polymerization of a mixture of ethylenically unsaturated compounds, including ethylenically unsaturated monomers comprising a multi-ethylenically unsaturated monomer; and
   (B) a polycarbodiimide; wherein, upon curing to form a cured coating, the cured coating formed from the curable aqueous composition demonstrates a glass transition temperature less than 25° C.

BRIEF DESCRIPTION OF THE DRAWING

The FIGURE is a schematic block diagram of a coating line in an automotive assembly plant illustrating features of the method of the invention.

DETAILED DESCRIPTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

As used herein, any numerical range recited is intended to include all sub-ranges subsumed therein. For example, a range of 1" to 10" is intended to include all sub-ranges between value of 1 and the recited maximum value of 10, that is, having a minimum value equal to or greater than 1 and a maximum value of equal to or less than 10.

Also, as used herein, the term "polymer" is meant to refer to oligomers and both homopolymers and copolymers. Unless stated otherwise, as used in the specification and the claims, molecular weights are either number average molecular weights as indicated by "Mn" or weight average molecular weights as indicated by "Mw", both of which obtained by gel permeation chromatography using polystyrene standards in an art-recognized manner. The term (meth) acrylates refers to both acrylates and methacrylates.

The FIGURE schematically depicts a coating line 1 used in an automotive assembly plant.

Useful substrates 2 that can be coated according to the method of the present invention include metallic substrates that can be used to fabricate automotive vehicles, such as automobiles, trucks and tractors. The substrates can have any shape, but in one embodiment are in the form of automotive body components such as bodies (frames), hoods, doors, fenders, bumpers and/or trim for automotive vehicles.

With reference to the FIGURE, a metal substrate 2 is passed to an electrodeposition station 4 where a coating compositions is electrodeposited over the metal substrate 2. Suitable electrodeposition coatings are ED 6280 and ED 7000 commercially available from PPG Industries. Useful electrodeposition methods and electrodeposition coating compositions include conventional anionic or cationic electrodepositable coating compositions, such as epoxy or polyurethane-based coatings. Suitable electrodepositable coatings are disclosed in U.S. Pat. Nos. 4,933,056; 5,530,043; 5,760,107 and 5,820,987. The electrodeposition coating layer is cured in an oven 6, before further processing. Curing conditions are typically from 175 to 205° C. for 20 to 60 minutes.

Unlike many conventional coating lines, the coating line of the invention does not include a primer-surfacer zone for application, curing, and/or sanding of a primer-surfacer. By eliminating the need for a primer-surfacer, the coating equipment required for primer-surfacer application, e.g., coating booths, coating applicators, drying ovens, sanding equipment, and tacking equipment, can also be eliminated. Additionally, the elimination of the primer-surfacer also speeds up the overall coating process and reduces the floor space and energy requirements needed to coat the substrate 2.

A basecoat layer is directly applied to the electrodeposited coating layer in a basecoat zone 20 comprising one or more coating stations. The basecoat zone 20 is located downstream of and adjacent to the electrodeposition oven 6. The first basecoat station 8 has one or more conventional applicators 22, e.g., bell or gun applicators, connected to or in flow communication with a source 24 of a first basecoat composition. The first basecoat composition can be applied, e.g., sprayed, over the substrate 2 by one or more applicators 22 at the first basecoat station 8 in one or more spray passes to form a first basecoat layer over the substrate 12. As will be described in more detail below, the first basecoat composition is an aqueous composition comprising a resinous binder that cures during dehydration of the basecoat layer and a color-imparting pigment composition comprising one or more coloring pigments. Typically when more than one basecoat layer is applied to the substrate, the first basecoat composition will not contain a color effect pigment such as aluminum flake or metal oxide coated micas. These color effect pigments will be applied in a second basecoat layer. However, where only one basecoat layer is applied to the substrate, the color effect pigments can be contained in the basecoat composition.

An optional drying device, such as an oven 10 or flash chamber, can be located downstream of and/or adjacent to the first basecoat station 8 to optionally dehydrate and cure the first basecoat layer. In one embodiment, there is no dehydration of the applied first basecoat composition before application of the second basecoat composition described below. However, when only one basecoat layer is applied to the substrate, the basecoat layer is dehydrated before application of the clearcoat. Typically, dehydration of the first basecoat layer will be at a temperature of ambient to 90° C., usually 50-80° C.

A second basecoat station 12 can be located downstream of and/or adjacent to the first basecoat station 8 and can have one or more conventional applicators 26, e.g., bell or gun applicators, connected to and in flow communication with a source 28 of a second basecoat composition described in more detail below. The second basecoat composition can be applied, e.g., sprayed, over the first basecoat composition by one or more applicators 26 in one or more spray passes to form a second basecoat layer over the first basecoat layer. In one embodiment, the second basecoat composition is applied "wet-on-wet" onto the first basecoat layer, i.e., there is no dehydration of the applied first basecoat composition before application of the second basecoat composition. Thus, a multilayer composite basecoat can be formed by the second basecoat layer applied over the first basecoat layer. As described in more detail below, the second basecoat composition is an aqueous composition comprising a resinous binder that cures during dehydration of the basecoat layer and can be the same or different than the resinous binder present in the first basecoat composition. The second basecoat composition also includes a second pigment composition that can be the same as or different than the first pigment composition.

A conventional drying device, such as an oven 14, is located downstream of and/or adjacent to the second coating station 12 and/or the first basecoat station 8 where the basecoats can be dried and cured. The second basecoat layer can be dehydrated and cured separately when the first basecoat layer has been previously dehydrated and cured. Typically, dehydration of the second basecoat layer will be at a temperature of ambient to 90° C., usually 50-80° C. Alternatively, when the second basecoat layer is applied wet-on-wet to the first basecoat layer, both basecoat layers can be simultaneously dehydrated and cured at a temperature of ambient to 90° C., usually 50-80° C.

After the basecoat layer(s) have been dehydrated and cured, one or more conventional clearcoat layers can be applied over the basecoat layer(s) at a clearcoat station 16. The clearcoat station includes one or more conventional applicators 30 (e.g., bell applicators) connected to and in flow communication with a source 32 of clearcoat composition. The clearcoat composition is unpigmented and contains resinous ingredients that are dissolved in a diluent that may be an organic solvent or may be a mixture of organic solvents and water. In the embodiment shown in FIG. 1, an oven 18 is located downstream of and/or adjacent to the clearcoat station 16 to cure the clear or transparent layer. Depending on the resinous ingredients in the clearcoat composition, curing typically occurs at a temperature of 80-150° C. for a period of 20 to 40 minutes. The clearcoat compositions are known in the art for automotive applications. Such compositions are described in U.S. Pat. Nos. 4,650,718; 5,814,410; 5,891,981 and WO 98/14379. Automotive clearcoat compositions are commercially available from PPG Industries under the trademarks NCT, DIAMOND COAT and CERAMICLEAR.

As used herein, "cure" means that resinous components of the coating layers are substantially crosslinked as evidenced by the attainment of physical and chemical properties necessary for automotive quality coatings. Cure or the degree of cure can be determined by dynamic mechanical thermal analysis (DMTA) using a Polymer Laboratories MK III DMTA analyzer conducted under nitrogen. Accordingly, cure means a degree of cure be at least 50, such as at least 85, and at least 90 percent of complete crosslinking as determined by the analysis mentioned above.

The curable aqueous compositions that are useful in the method of the invention comprise a dispersion of polymeric particles in a continuous aqueous phase. The polymeric particles are prepared from the polymerization of a mixture of ethylenically unsaturated compounds including ethylenically unsaturated monomers that comprise at least one multi-ethylenically unsaturated monomer.

The dispersion of polymeric particle can be made by conventional oil in water emulsion polymerization techniques typically to a solids content of 20 to 50 percent by weight. The polymerization can be conducted using conventional additives such as emulsifiers, protective colloids, free radical initiators and chain transfer agents. Generally, the polycarbodiimide is added after the polymerization. The polymeric particles have a mean particle size (diameter) of from 40 to 250 nanometers.

The multi-ethylenically unsaturated monomers are typically diethylenically or triethylenically unsaturated monomers. Suitable monomers include divinyl aromatics such as divinyl benzene, diacrylates and dimethacrylates of $C_{2-24}$ diols such as butane diol and hexane diol, divinyl ethylene urea and other divinyl ureas, and diallyl and triallyl compounds such as diallyl phthalate and triallyl isocyanurate. The amount of multi-ethylenically unsaturated monomers is 2 to 30 percent by weight based on total weight of ethylenically unsaturated monomer. The inclusion of such monomers causes crosslinking between the polymer backbones, which is important because such crosslinking allows the basecoat to hold out the subsequently applied clearcoat from stretching in to the basecoat adversely affecting appearance and physical properties. Amounts less than 2 percent by weight provide insufficient crosslinking, whereas amounts greater than 30 percent are also undesirable because the composition becomes very viscous and difficult to process.

Besides the multi-ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers. These monomers provide for low glass transition temperatures ($T_g$) in the cured basecoat layers, which is desirable because of road stone and chip resistance. $T_g$s less than 25° C. are desirable.

The $T_g$ can be measured on a cured film of the polymeric particles by Differential Scanning Colorimetry (rate of heating of 10° C./minute with the $T_g$ taken at the first inflection point). Examples of suitable monomers include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

Other ethylenically unsaturated monomers may also be used such as hydroxyalkyl esters of (meth)acrylic acid such as hydroxyethyl and hydroxypropyl (meth)acrylate; alkyl esters of (meth)acrylic acid having 1 to 2 carbon atoms in the alkyl group such as methyl (meth)acrylate; acid group containing monomers such as (meth)acrylic acid; and vinyl aromatic monomers such as styrene and vinyl toluene. Amounts of 0 to 60 percent are typical.

Besides the ethylenically unsaturated monomers, other ethylenically unsaturated compounds may be used. An example of such a compound is an ethylenically unsaturated polyurethane. These materials can be prepared by reaction of a polyisocyanate, usually a diisocyanate with a polyol, a polyol such as a diol containing carboxylic acid groups, optionally another polyol having a number average molecular weight of 60 to 10,000 and a hydroxyl group-containing ethylenically unsaturated monomer.

Among the polyisocyanates that may be used are aliphatic including cycloaliphatic diisocyanates such as tetramethylene diisocyanate, 2,2,4-trimethylhexane diisocyanate, hexamethylene diisocyanate, lysine diisocyanate, as well as alicyclic diisocyanates such as 1,4-cyclohexylene diisocyanate, 4,4'-dicyclohexylmethane diisocyanate, isophorone diisocyanate and the like.

As polyols, there may be used low molecular weight glycols, high molecular weight glycols, such as polyether polyols, and the like individually, or mixtures of high molecular weight glycols and low molecular weight glycols.

Examples of low molecular weight glycols are ethylene glycol, diethylene glycol, triethylene glycol, 1,2-propylene glycol, 1,3-butylene glycol, tetramethylene glycol, hexamethylene glycol, and the like, which may be used individually or in admixture.

Examples of high molecular weight polyglycols, are polyethylene glycol, polypropylene glycol, polytetramethylene glycol, and the like.

Examples of carboxylic acid group-containing polyols, are 2,2-dimethylol propionic acid, 2,2-dimethylol butyric acid, 2,2-dimethylol valeric acid, and the like. Typically, the carboxylic acid group-containing polyols are present in amounts of 5 to 30 percent by weight based on weight of resin solids of the ethylenically unsaturated polyurethane. The acid value of the ethylenically unsaturated polyurethane is typically about 20 to 60 based on resin solids of the ethylenically unsaturated polyurethane.

Examples of hydroxyl group-containing ethylenically unsaturated monomers are (meth)acrylates such as 2-hydroxyethyl (meth)acrylate, hydroxypropyl (meth)acrylate, hydroxybutyl (meth)acrylate, and the like.

Also, allyl compounds such as allyl alcohol may be used.

The synthesis reaction of the ethylenically unsaturated polyurethane resin may be carried out with one or more of the acrylic monomers such as 2-ethylhexyl (meth)acrylate acting as a reactive solvent. Also, an unreactive organic solvent that is inactive to the isocyanate group and which has high compatibility with water, such as dioxane, acetone, methyl ethyl ketone, methyl isobutyl ketone, N-methyl pyrrolidone, tetrahydrofuran and the like may be used.

The proportions of the hydroxyl group-containing reactants may be changed variously but the equivalent ratio between isocyanate groups and hydroxyl groups in all components is from 1:1 to 1:1.5 such as 1:1 to 1:1.3. The amount of the hydroxyl group-containing ethylenically unsaturated monomer may be 0.01-1, usually 0.02-0.8 equivalent to 1 equivalent of isocyanate group.

Preparation of the ethylenically unsaturated polyurethane resin is not limited to any one method, and diisocyanate, a polyol, a carboxyl group-containing diol and a hydroxyl group-containing ethylenic unsaturated monomer may be reacted simultaneously, or the resin may be prepared by multi-step reaction method. In the latter case, a diisocyanate is reacted with a part of the polyol and a carboxyl group-containing diol to synthesize a prepolymer having the isocyanate end, and thereafter the remainder of the polyol and a hydroxyl group-containing ethylenic unsaturated monomer are reacted with the prepolymer. Generally, the reaction may be carried out at the temperature of 40-180° C., usually 60-130° C.

In order to accelerate the reaction, there may be used catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenic unsaturated compound during the urethane reaction, there may be used hydroquinone, hydroquinone monomethyl ether, p-benzoquinone and the like.

For enhanced dispersion stability, the polymeric particles can contain an amine salt group. Typically, this can be incorporated into the particle by forming the amine salt of the acid associated with the ethylenically unsaturated polyurethane. The acid groups can be at least partially neutralized, i.e., at least 30 percent of the total neutralization equivalent, by an inorganic base such as sodium hydroxide or an amine, particularly a volatile amine. Examples of suitable amines are ammonia, dimethylamine, trimethylamine, monoethanolamine and dimethylethanolamine. By carboxylic acid functionality is meant carboxylic acid as well as salts thereof.

The ethylenically unsaturated polyurethanes typically comprise from 30 to 60 percent by weight of the ethylenically unsaturated compounds used in the preparation of the polymeric particles and ethylenically unsaturated monomers comprise from 40 to 70 percent by weight of the ethylenically unsaturated compounds; the percentages by weight being based on total weight of the ethylenically unsaturated compounds.

The aqueous thermosetting coating compositions also contain a water-dispersible polycarbodiimide that is reactive with the carboxylic acid functionality in the polymeric particles during dehydration and amine volatilization of the basecoat(s) layer(s) to form a crosslinked coating.

"Water dispersible" and like terms, when used in conjunction with carbodiimide, refer to carbodiimide dissolved or dispersed in aqueous phase. In order to utilize certain carbodiimides in the present invention, it may be necessary to modify the carbodiimides to make them water dispersible. Techniques for modifying carbodiimides to make them water dispersible are well known in the art.

Suitable water dispersible carbodiimide crosslinkers include an aliphatic and/or cycloaliphatic dinitrogen analogue of carbonic acid of the generalized structure: $RN=C=NR_1$ where R and $R_1$ are independently aliphatic or cycloaliphatic groups. The aliphatic groups can comprise 1-6 carbon atoms. Examples include dibutyl carbodiimide and dicyclohexyl carbodiimide. Oligomeric or polymeric carbodiimide crosslinkers can also be used. Examples of such materials are disclosed in US 2009/0246393A1.

The preparation of water dispersible carbodiimide crosslinkers is well known in the art. Suitable water dispersible carbodiimide crosslinkers can be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure.

Suitable water dispersible carbodiimides are commercially available. For example, UCARLINK XL-29SE, XL-20 is commercially available from Union Carbide and CARBODILITE VO2-L2 is commercially available from Nisshinbo Industries, Inc.

The equivalent ratio of carbodiimide to carboxylic acid is typically 0.5 to 1.5:1, such as 0.8 to 1.2:1. The amount of the dispersed carbodiimide in the aqueous medium can be at least 1 percent by weight, such as from 1 to 50 percent, typically 5 to 25 percent by weight based on weight of resin solids of the curable aqueous composition.

Besides the above components, the curable aqueous composition also contains color-imparting components such as organic and inorganic pigments, including color effect pigments such as aluminum flake and metal oxide coated micas. The pigments are typically present in the curable aqueous compositions such that the pigment to resin ratio is from 0.02 to 1.5:1 and usually the pigment is present in the composition in amounts of 2 to 70 percent by weight based on total weight of the composition.

Other optional ingredients such as dyes, wetting agents, defoamers, leveling agents, fillers, plasticizers, fungicides and solvents may also be present in the curable aqueous composition. These optional ingredients may be present in amounts up to 20 percent by weight based on total weight of the curable aqueous composition.

The aqueous curable composition can be formulated by blending the dispersion of the polymeric particles and polycarbodiimide with the other ingredients with low shear mixing. The composition can be applied to the substrate by conventional techniques such as spraying, brushing and roll coating. The coated substrate is then dried at ambient temperature, that is, 20-25° C., or may be heated to 90° C. to cure the composition. The curing time will vary depending on the temperature and relative humidity. Typically, curing times are from 5 to 120 minutes.

EXAMPLES

Illustrating the invention are the following Examples that are not to be considered as limiting the invention to their details. All parts and percentages in the Examples as well as throughout the specification are by weight unless otherwise indicated.

The following Examples show the preparation of various lattices (i.e., continuous phase comprising water and a dispersed phase comprising polymeric particles) that were used in formulating basecoat compositions.

Example A' (Polyurethane)

A mixture containing a polyurethane acrylate prepolymer was prepared by adding 100 g of 2-ethylhexyl acrylate (EHA), 79.2 g of hydroxyethyl methacrylate, 81.6 g of dimethylol propionic acid, 1.5 g of 2,6-di-tert-butyl 4-methyl phenol, 0.8 g of triphenyl phosphite, 4 g triethyl amine and 0.8 g of dibutyl tin dilaurate to a four necked round bottom flask fitted with a thermocouple, mechanical stirrer, and condenser and heated to 90° C. to obtain a homogeneous solution. Then 405.5 g of polytetrahydrofuran molecular weight 1000 was added. To this mixture at 90° C., isophorone diisocyanate 225.4 g was added over 90 minutes. The isocyanate container was rinsed with 20.0 g of EHA. The reaction mixture was stirred at 90° C. until all the isocyanate groups were reacted. Then 454.0 g of EHA and 72.5 g of propylene glycol monomethyl ether was added and cooled to ambient temperature.

Example A

Polyurethane Acrylic Latex

For the purpose of control, a polyurethane acrylic latex with 5.5% multi-ethylenically unsaturated monomer was prepared as follows:

Ten (20.0) g of Aerosol OT-75 (surfactant from Cytec Industries), 14.0 g of dimethyl ethanolamine, 369 g of prepared polyurethane/EHA mixture of Example A', 14.5 g of 1,6-hexanediol diacrylate, 97.0 g methyl methacrylate and 711 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example B

A polyurethane acrylic latex containing 32.7 percent by weight of diacetone acrylamide (DAAM) and 5.1 percent by weight of 1,6-hexanediol diacrylate, the percentages by weight being based on total weight of ethylenically unsaturated monomers, was prepared as follows:

Seven (7.0) g of Aerosol OT-75, 10.0 g of Sipomer PAM 200 (acrylic functional monomer from Solvay-Rhodia), 10.0 g of 28% ammonium hydroxide, 369 g of prepared polyurethane/acrylate mixture (above example), 13.7 g of 1,6-hexanediol diacrylate, 22.0 g of methyl methacrylate, 88.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS, 0.23 g of FOAMKILL 649 and 9.6 g of deionized water were charged into the flask and mixed for 15 minutes.

Examples 1-4

Four (4) basecoat compositions were prepared from the following mixture of ingredients:

| Components | Parts by weight of Component | | | |
|---|---|---|---|---|
| | Ex. 1 (Control) | Ex. 2 | Ex. 3 | Ex. 4 |
| Polyurethane-acrylic latex of Example A | 126.83 | 179.14 | 147.72 | 113.69 |
| Carbodilite V-02-L2[1] | — | 15.00 | 30.00 | 62.50 |
| Urethane Diol[2] | 6.92 | 6.92 | 6.92 | 6.92 |
| Byk 348[3] | 0.44 | 0.44 | 0.44 | 0.44 |
| Byk 032[3] | 1.73 | 1.73 | 1.73 | 1.73 |
| P-1000E[4] | 5.06 | 5.06 | 5.06 | 5.06 |
| Resimene HM2608[5] | 22.20 | — | — | — |
| Deionized Water | 34.90 | 30.26 | 31.20 | 36.30 |
| Tinuvin 1130[6] | 2.60 | 2.60 | 2.60 | 2.60 |
| 50% DMEA[7] | 0.01 | 0.01 | 0.01 | 0.01 |
| White Tint[8] | 225.58 | 225.58 | 225.58 | 225.58 |
| Byketol WS[3] | 11.25 | 11.25 | 11.25 | 11.25 |
| Surfynol 104E[9] | 11.52 | 11.52 | 11.52 | 11.52 |
| TOTAL | 449.04 | 489.51 | 474.03 | 477.60 |

[1]Polycarbodiimide crosslinker commercially available from Nisshinbo.
[2]Polyurethane diol prepared by reacting 1 mole of Jeffamine D-400 (from Huntsman Chemical Co.) with 2 moles of ethylene carbonate at 130° C. See U.S. Pat. No. 7,288,595.
[3]Additives available from Byk Chemie.
[4]Polyglycol P-1000E commercially available from Dow Chemical.
[5]Melamine curing agent commercially available from INEOS Melamines.
[6]UV absorber commercially available from Ciba-Geigy AG.
[7]Dimethylethanolamine 50% aqueous solution.
[8]White tint paste consisting of 61% TiO$_2$ dispersed in 9% acrylic polymer blend and having a solids content of 70%.
[9]Surfactant commercially available from Air Products and Chemicals, Inc.

Each basecoat was spray applied in an environment controlled to 70-75° F. (21-24° C.) and 50-60% relative humidity onto 4 inch by 12 inch (10 cm by 30 cm) steel panels that were coated with cured PPG Electrocoat (ED 6060CZ). The basecoats were applied in two coats, without a flash between coats, and then flashed at ambient temperature for 5 minutes and then baked for 30 minutes at either 80° C. or 140° C. The film thickness was approximately 0.9-1.2 mils (23-31 microns).

Physical properties were measured on the coated panels. Higher Fischer Microhardness is a more desirable property. Higher MEK double rubs demonstrates better cure. Good adhesion is a desirable property.

Basecoat Composition—Physical Properties

| Example | Bake Temperature | Fischer Microhardness | MEK Double Rubs | Adhesion[10] |
|---|---|---|---|---|
| 1 | 80° C. | 14 | 5 | 0 |
| 2 | | 13 | 90 | 0 |

-continued

| Example | Bake Temperature | Fischer Microhardness | MEK Double Rubs | Adhesion[10] |
|---|---|---|---|---|
| 3 | | 18 | 100 | 5 |
| 4 | | 24 | 100 | 5 |
| 1 | 140° C. | 45 | 100 | 5− |
| 2 | | 20 | 100 | 5− |
| 3 | | 27 | 100 | 5 |
| 4 | | 39 | 100 | 5 |

[10]ASTM D3359 Classification of Adhesion Test Results method, 5 = best.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of applying a multilayer coating to a substrate comprising:
  (a) applying, without application of an intermediate primer surfacer coating, a color-imparting, pigment-containing basecoat composition directly to a cured electrodeposited primer coating that is adhered to the substrate to form a curable color-imparting basecoat layer,
  (b) dehydrating the basecoat layer to form a cured coating,
  (c) applying a curable unpigmented coating composition to the cured coating to form a clear or transparent coating layer over the cured coating, wherein the basecoat layer is formed by depositing a curable aqueous composition comprising:
    (i) a continuous phase comprising water, and
    (ii) a dispersed phase comprising:
      (A) polymeric particles containing carboxylic acid functionality prepared from the polymerization of a mixture of ethylenically unsaturated compounds comprising a multi-ethylenically unsaturated monomer; and
      (B) a polycarbodiimide; and
  (d) curing the unpigmented coating composition; wherein during dehydration of the basecoat layer, the polycarbodiimide reacts with the carboxylic acid functionality to form the cured coating, and wherein the cured coating formed from the curable aqueous composition demonstrates a glass transition temperature less than 25° C.

2. The method of claim 1 wherein the mixture of ethylenically unsaturated compounds includes an ethylenically unsaturated polyurethane.

3. The method of claim 2 wherein the ethylenically unsaturated polyurethane is prepared by reacting an organic polyisocyanate with a polyol containing carboxylic acid functionality and a hydroxyalkyl (meth)acrylate such that the ethylenically unsaturated polyurethane is free of NCO groups.

4. The method of claim 2 wherein the ethylenically unsaturated polyurethane has an acid value of 20 to 60 based on resin solids of the ethylenically unsaturated polyurethane.

5. The method of claim 2 wherein the ethylenically unsaturated polyurethane is present in the mixture of ethylenically unsaturated compounds in an amount of 30 to 60 percent by weight, based on the total weight of the mixture of ethylenically unsaturated compounds.

6. The method of claim 1 wherein the multi-ethylenically unsaturated monomer is present in the mixture of ethylenically unsaturated compounds in an amount of 2 to 30 percent by weight based on the total weight of the ethylenically unsaturated compounds.

7. The method of claim 1 wherein the ethylenically unsaturated compounds comprise 4 to 30 percent by weight of an alkyl ester of (meth)acrylic acid having at least 6 carbon atoms in the alkyl group, based on the total weight of the ethylenically unsaturated compounds.

8. The method of claim 1 wherein the equivalent ratio of polycarbodiimide to carboxylic acid is from 0.5 to 1.5:1.

9. The method of claim 1 wherein the curable unpigmented coating composition comprises an active hydrogen-containing polymer and a polyisocyanate curing agent.

10. The method of claim 1 wherein the basecoat composition is cured at ambient to 90° C.

11. A method of applying a multilayer coating to a substrate comprising:
  (a) applying, without application of an intermediate primer surfacer coating, a first aqueous curable color-imparting coating composition containing one or more coloring pigments, not including a color effect pigment, directly on a cured electrodeposited layer that is adhered to the substrate to form a first curable basecoat layer;
  (b) applying a second aqueous curable color-imparting coating composition containing one or more coloring pigments, including a color effect pigment, directly on the first curable basecoat layer to form a second curable basecoat layer; wherein at least one of the basecoat layers is formed by depositing a curable aqueous composition comprising:
    (i) a continuous phase comprising water, and
    (ii) a dispersed phase comprising:
      (A) polymeric particles containing carboxylic acid functionality prepared from the polymerization of a mixture of ethylenically unsaturated compounds comprising a multi-ethylenically unsaturated monomer; and
      (B) a polycarbodiimide;
  (c) dehydrating the basecoat layers, wherein during dehydration of the basecoat layers, the polycarbodiimide reacts with the carboxylic acid functionality to form a cured coating;
  (d) applying a curable unpigmented coating composition to the cured coating to form a clear or transparent coating layer over the cured coating; and
  (e) curing the unpigmented coating composition; wherein the cured coating formed from the curable aqueous composition demonstrates a glass transition temperature less than 25° C.

12. The method of claim 11 wherein the first basecoat layer is formed by depositing the curable aqueous composition and is dehydrated at a temperature within the range of ambient temperature to 90° C. to cure the first basecoat layer.

13. The method of claim 11 wherein the second basecoat layer is formed by depositing the curable aqueous composition and is dehydrated at a temperature within the range of ambient temperature to 90° C. to cure the second basecoat layer.

14. The method of claim 11 wherein both the first and second basecoat layers are formed by depositing the curable aqueous composition and are simultaneously dehydrated at a temperature range of ambient to 90° C. to cure the first and second basecoat layers.

* * * * *